(12) United States Patent
Hamaie et al.

(10) Patent No.: US 8,132,192 B2
(45) Date of Patent: Mar. 6, 2012

(54) OPTICAL DISK APPARATUS

(75) Inventors: Seiji Hamaie, Kawasaki (JP); Nozomu Harada, Kawasaki (JP); Shinya Asano, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 549 days.

(21) Appl. No.: 12/330,120

(22) Filed: Dec. 8, 2008

(65) Prior Publication Data
US 2009/0235289 A1 Sep. 17, 2009

(30) Foreign Application Priority Data
Mar. 13, 2008 (JP) .................................. 2008-064746

(51) Int. Cl.
*G11B 17/03* (2006.01)
(52) U.S. Cl. ........ 720/603; 720/601; 720/648; 720/649; 720/651; 720/692
(58) Field of Classification Search ................... 720/603, 720/601, 648, 649, 651, 692
See application file for complete search history.

(56) References Cited

U.S. PATENT DOCUMENTS

| | | | | |
|---|---|---|---|---|
| 6,496,464 B1 * | 12/2002 | Yamauchi et al. | ............ | 720/622 |
| 6,529,461 B1 * | 3/2003 | Watanabe et al. | ............ | 720/732 |
| 6,577,577 B2 * | 6/2003 | Watanabe et al. | ............ | 720/603 |
| 6,741,454 B2 * | 5/2004 | Tozune et al. | ............ | 361/679.23 |
| 6,922,836 B2 * | 7/2005 | Watanabe | ............ | 720/601 |
| 6,961,947 B2 * | 11/2005 | Chuang et al. | ............ | 720/611 |
| 7,340,754 B2 * | 3/2008 | Yamauchi et al. | ............ | 720/651 |
| 7,430,748 B2 * | 9/2008 | Wu | ............ | 720/611 |
| 7,450,337 B2 * | 11/2008 | Chan et al. | ............ | 360/97.02 |
| 7,698,714 B2 * | 4/2010 | Choi | ............ | 720/601 |
| 7,827,571 B2 * | 11/2010 | Yamauchi et al. | ............ | 720/651 |
| 7,937,721 B2 * | 5/2011 | Watabe et al. | ............ | 720/649 |
| 2004/0042371 A1 * | 3/2004 | Lee | ............ | 369/75.2 |

FOREIGN PATENT DOCUMENTS

| JP | 2003-036664 | 2/2003 |
|---|---|---|
| JP | 2005-092946 | 4/2005 |

* cited by examiner

*Primary Examiner* — Viet Q Nguyen
(74) *Attorney, Agent, or Firm* — Kilpatrick Townsend & Stockton LLP

(57) ABSTRACT

In a prior art slim-type high speed rotation optical disk apparatus, the side wall of the bottom chassis is bent at a bending point toward the side of the optical disk according to the configuration of the corner air window section of the chassis. According to the present invention, this bent side wall is formed so as to have a first vertical wall which is adjacent to the bending point and a second vertical wall which is adjacent to and lower than the first vertical wall. This constitutes an L-shaped vertical wall in the air window section of the bottom chassis, resulting in reduced noise.

2 Claims, 5 Drawing Sheets

OPTICAL DISK APPARATUS

CLAIMS OF PRIORITY

The present application claims priority from Japanese patent application serial no. JP 2008-064746, filed on Mar. 13, 2008, the content of which is hereby incorporated by reference into this application.

BACKGROUND OF THE INVENTION

The present invention relates to optical disk apparatus and in particular to an optical disk apparatus capable of suppressing its noise and vibration while the motor is driven to rotate. The present invention is suitable for a slim-type optical disk apparatus which is incorporated in a notebook-sized personal computer or the like.

As read/write apparatus for digital information, CD drives, DVD drives and other optical disk apparatus have since long been widespread.

Especially, with the popularity of notebook-sized personal computers (hereinafter "notebook PCs") in the recent years, light-weight ones designed to set an optical disk on a turn table have shown a tendency to increase in production quantity.

In addition, with the progress and development of optical disk technology for recording/reproducing, optical disk apparatus are expected to increase their storage capacities more and more. To read/write data from/to such an optical disk at high speed, it is demanded to further raise the disk rotation speed. Accordingly, optical disk apparatus are remarkably advancing in the drive speed, too.

In optical disk apparatus employed by notebook PCs, a chassis block into which a tray is inserted for disk rotation is constructed by combining a top chassis and a bottom chassis so air-tightly as to prevent noise.

FIG. 1 and FIG. 2 of Japanese Patent Laid-Open No. 2005-92946 disclose a chassis block constructed by combining a top chassis and a bottom chassis. Japanese Patent Laid-Open No. 2003-36664 discloses an optical disk apparatus in which the air window at the rear right corner is provided with a cover member for preventing the outflow of air.

SUMMARY OF THE INVENTION

With reference to FIG. 5, the following provides a description of how the chassis is shaped in a prior art optical disk apparatus.

FIG. 5 is provided for explaining how the chassis is shaped in the prior art optical disk apparatus.

In this figure, the tray is inserted in the chassis. For convenience of description, only the bottom chassis is depicted with the top chassis omitted.

The bottom chassis has a vertical wall 102 along a side and a vertical wall 101 in the air window section. The vertical wall 101 in the air window section serves to push back the air flow inwardly.

However, since the vertical wall 101 is close to the rotating surface of the optical disk, this shape as a chassis may disturb the air flow due to the rotation of the optical disk and consequently generate abnormal sound.

Merely reducing the area covered by the vertical wall may not only weaken the physical strength of the chassis but also increase the noise since the sound of the rotating optical disk itself leaks outward.

Such a weight-reduced optical disk apparatus as described above is employed by a notebook PC which is close to the user who operates it and therefore must be more noise-free than those mounted on desktop PCs.

The present invention was made to solve the above-mentioned problem. It is an object of the present invention to provide a slim-type, high rotation speed optical disk apparatus with low noise while securing the physical strength of the chassis.

In a prior art optical disk apparatus, the side wall of the bottom chassis is bent at a bending point toward the side of the optical disk according to the configuration of the corner air window section of the chassis.

In an optical disk apparatus of the present invention, this bent side wall is formed so as to have a first vertical wall which is adjacent to the bending point and a second vertical wall which is adjacent to and lower than the first vertical wall. This constitutes an L-shaped vertical wall in the air window section of the bottom chassis.

This reduces the interaction between air flows caused by the rotating optical disk and therefore suppresses the noise attributable to the air flows.

By this configuration of the present invention, it is possible to provide a slim-type high rotation speed optical disk apparatus with low noise while securing the physical strength of the chassis.

According to the above-mentioned construction of the present invention, it is possible to provide a slim-type high speed rotation optical disk apparatus with low noise while securing the physical strength of the chassis.

DESCRIPTION OF THE PREFERRED EMBODIMENT

With reference to FIG. 1 through FIG. 4, the following will describe an embodiment of the present invention.

Figure 1A:
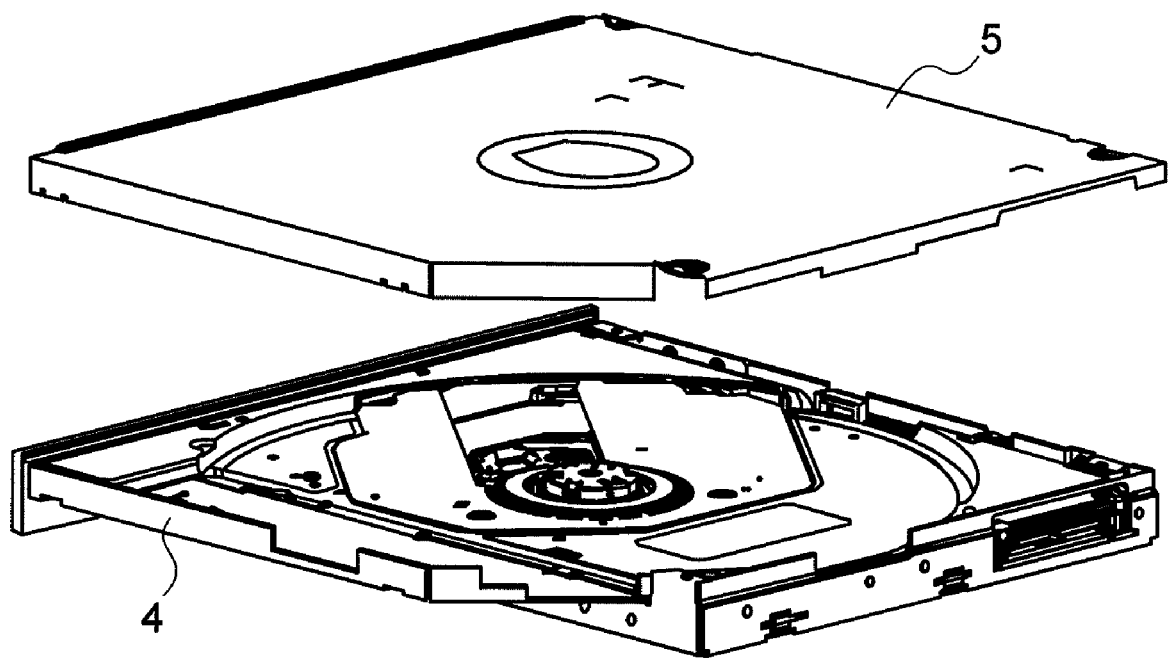
FIG. 1A is a (first) general perspective view of an optical disk apparatus in accordance with an embodiment of the present invention.
Figure 1B:
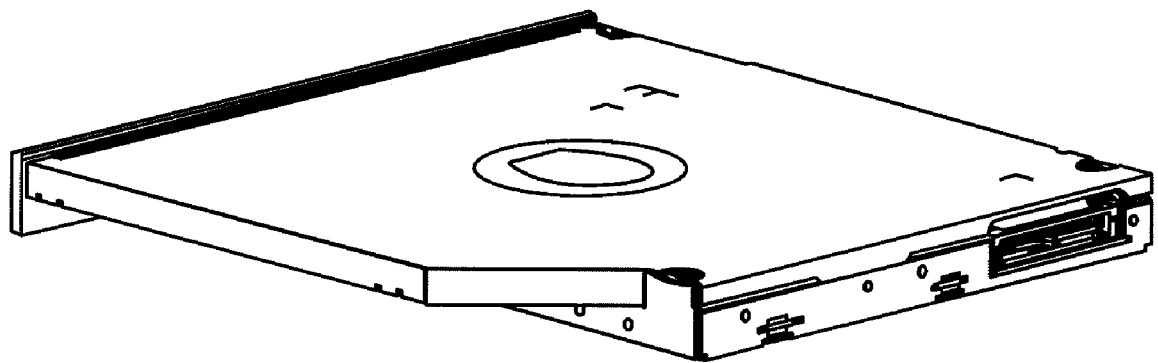
FIG. 1B is a (second) general perspective view of an optical disk apparatus in accordance with the embodiment of the present invention.
Figure 1C:
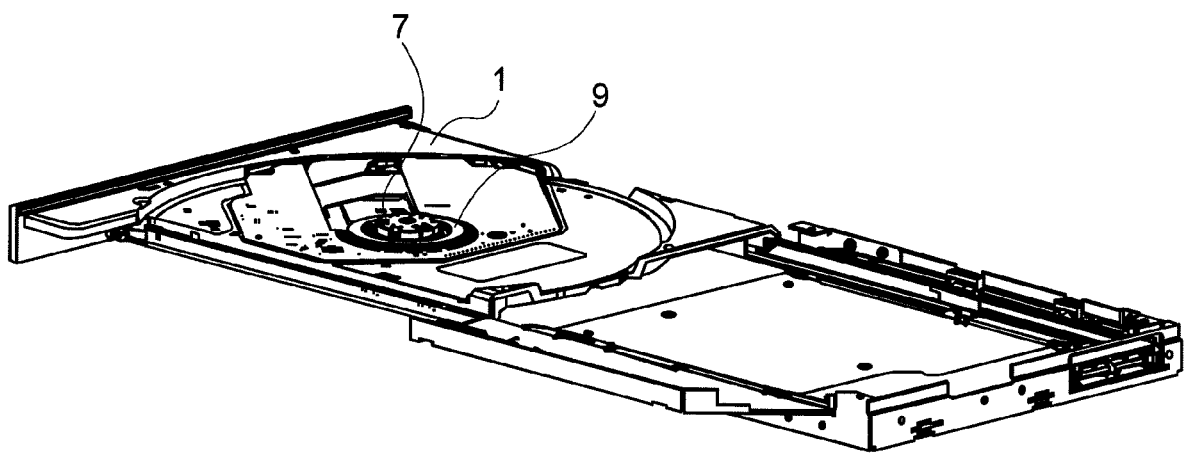
FIG. 1C is a (third) general perspective view of an optical disk apparatus in accordance with the embodiment of the present invention.

FIG. 1A through FIG. 1C provide general perspective views of an optical disk apparatus in accordance with the embodiment of the present invention.

Figure 2:
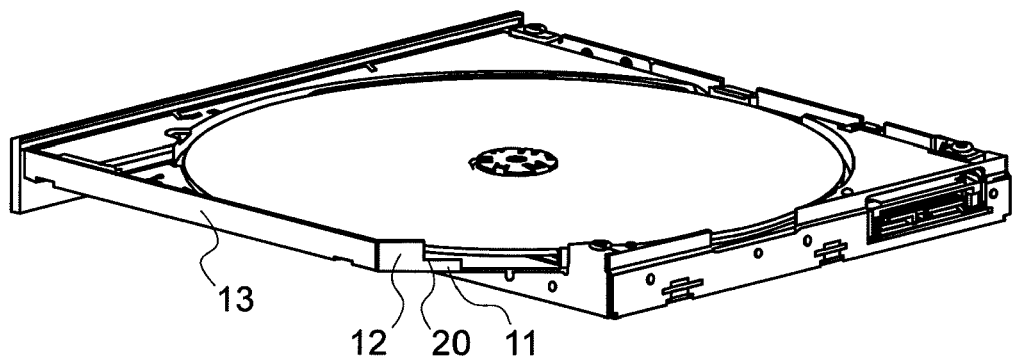
FIG. 2 is a perspective view for explaining the shape of the chassis in accordance with the embodiment of the present invention.

FIG. 2 is a perspective view for explaining the shape of the chassis in the embodiment of the present invention.

Figure 3:
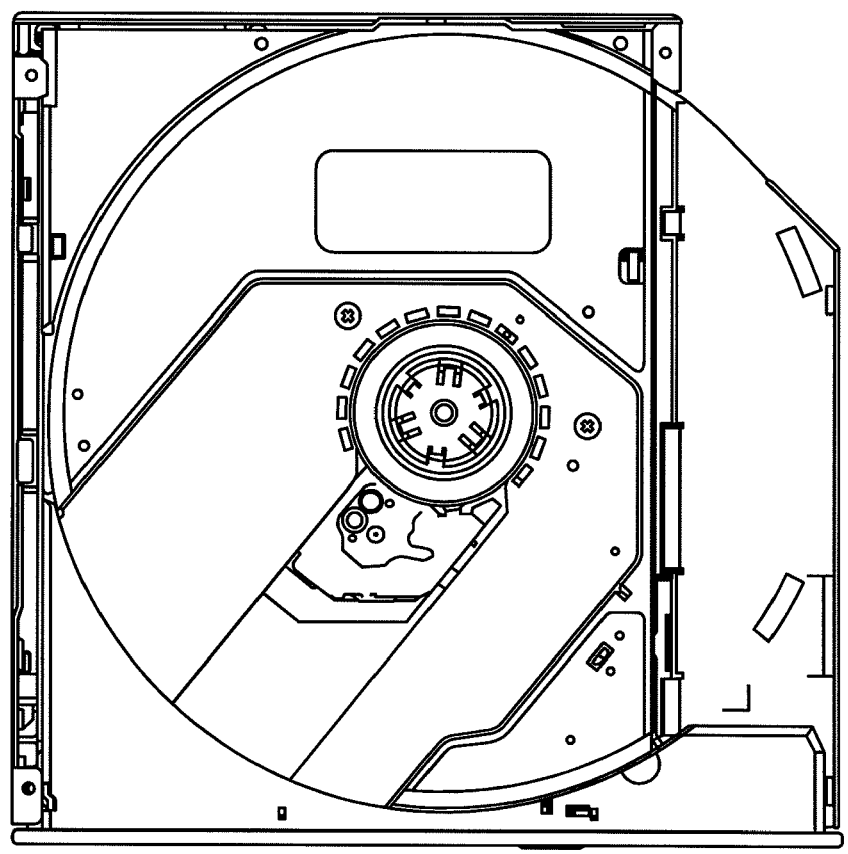
FIG. 3 is a top view for explaining the shape of the chassis in accordance with the embodiment of the present invention.

FIG. 3 is a top view for explaining the shape of the chassis in the embodiment of the present invention.

Figure 4:
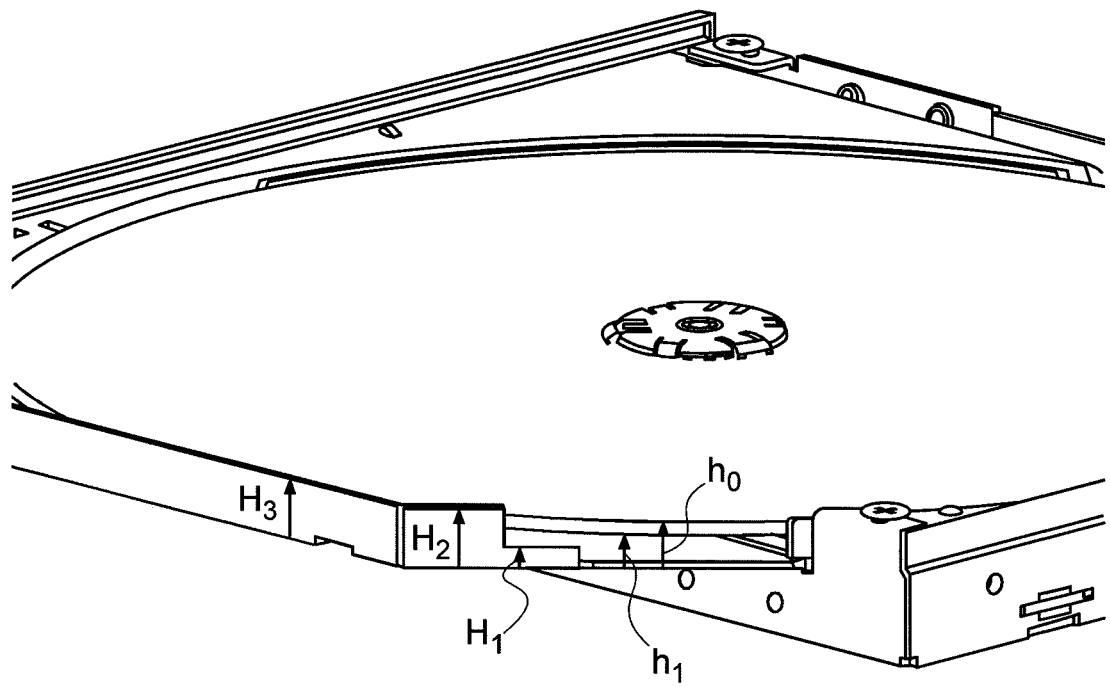
FIG. 4 is an enlarged view of the bottom chassis's vertical wall in the vicinity of the air window section.
Figure 5:
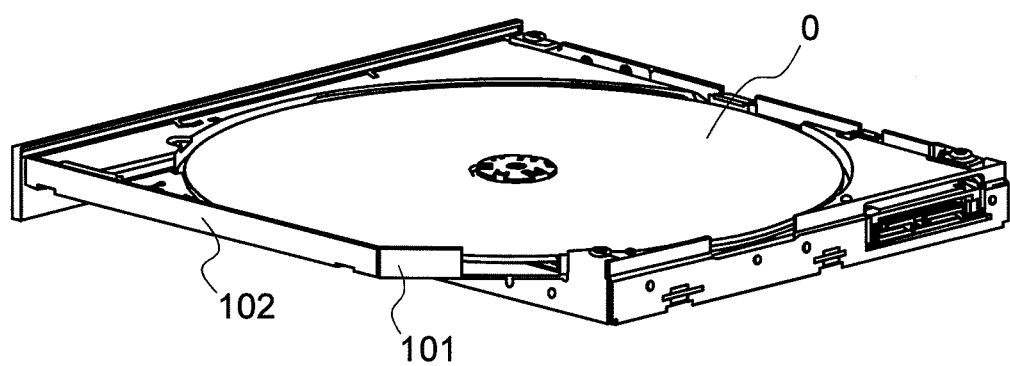
FIG. 5 is illustrated for explaining the shape of the chassis in a prior art optical disk apparatus.

FIG. 4 is an expanded view of the air window and its vicinities.

The optical disk apparatus in accordance with the present embodiment is a slim-type drive unit which is to be incorporated in a notebook PC or the like. As shown in FIG. 1A through FIG. 1C, it is designed so that if an eject button is pushed or an eject operation is made from a personal computer, a mechanical structure works to eject the optical-disk loading tray 1 from the chassis block which is formed by fitting together a top chassis 5 and a bottom chassis 4.

In FIG. 1A, the tray is inserted in the chassis block wherein the top chassis 5 is removed from the bottom chassis 4 of the chassis block. In FIG. 1B, the tray is inserted in the chassis block wherein the top chassis 5 and the bottom chassis 4 are fit together. In FIG. 1C, the tray is ejected from the chassis block wherein the top chassis 5 is removed from the bottom chassis 4.

To read/write data to/from a CD, DVD or other optical disk, the user sets the optical disk on the turn table 9 by fixing it around the rotary axis and inserts the tray 1 in the chassis block. Laser light to read/write data is applied from the optical pickup 7. When data is read/written, the turn table 9 is rotated by a spindle motor which is not shown in the figure.

After data read/write processing is complete, the user ejects the tray 1 by pushing the eject button or making an eject operation from the PC and then removes the optical disk.

As shown in FIG. 2 and FIG. 3, the shape of the chassis in the present optical disk apparatus embodiment is such that, viewed from the front side, the right rear corner of the chassis has an air window, and the air window section is partly supported by the bottom chassis 4. The corner air window extends from the side face of the bottom chassis 4 to the top face.

As understood from this perspective view, the side wall of the bottom chassis 4 is bent at a point on the side face of the bottom chassis 4 toward the side of the optical disk according to the configuration of the air window.

In addition, the bottom chassis 4 of the present optical disk apparatus embodiment is designed so that the vertical wall in the air window section comprises a low vertical wall 11 and a high vertical wall 12 adjacent to the vertical wall 13 constituting the side face of the bottom chassis 4. In the air window section, the bent vertical walls of the bottom chassis 4 are L-shaped when viewed sidewise.

Here, $h_0$ denotes the height of the top surface of the optical disk while $h_1$ denotes the height of the bottom surface. In addition, $H_1$ denotes the height of the low vertical wall 11 in the air window section, $H_2$ likewise denotes the height of the high vertical wall 12, and $H_3$ denotes the height of the side vertical wall of the bottom chassis 4.

The height $H_2$ of the high vertical wall 12 and the height $H_3$ of the side vertical wall 13 of the bottom chassis 4 are the same, hence $H_2=H_3$.

The height $H_1$ of the low vertical wall 11 in the air window section is set so as to satisfy $H_1<h_1$. In addition, the height $H_2$ of the high vertical wall 12 in the air window section is set so as to satisfy $h_0<H_2$.

According to this configuration, the low vertical wall 11 in the air window section can prevent downward sound leak. In addition, it is possible to suppress the abnormal sound attributable to air disturbance as compared with the prior art one since the vertical edge 20 between the low vertical wall 11 and high vertical wall 12 in the air window section is more distant from the side of the optical disk.

By the high vertical wall 12 in the air window section and the side vertical wall 13, it is also possible to secure air tightness and consequently prevent the leakage of the rotating motor's noise.

What is claimed is:

1. An optical disk apparatus which rotates an optical disk and records/reproduces information thereto/therefrom by applying laser light thereto from an optical pickup, the optical disk apparatus comprising:
    a chassis block assembled by engaging the side wall of a top chassis with the side wall of a bottom chassis; and
    a tray for setting the optical disk thereon,
    wherein the side wall of the bottom chassis is bent at a bending point thereof toward the side of the optical disk according to the configuration of the air window on the bottom chassis, and the bent side wall comprises a first vertical wall which is located at the end of the bent side wall and a second vertical wall which is adjacent to the first vertical wall, and
    wherein the height of the first vertical wall is lower than the height of the second vertical wall.

2. The optical disk apparatus according to claim 1, wherein the height of the first vertical wall is lower than the height of the optical disk's bottom surface, and the height of the second vertical wall is higher than the height of the optical disk's top surface.

* * * * *